United States Patent [19]

Porter

[11] Patent Number: 4,558,380
[45] Date of Patent: Dec. 10, 1985

[54] DIGITAL TAPE TRANSPORT FOR SELECTIVELY RECORDING IN EITHER A PARALLEL OR SERIAL MODE

[75] Inventor: Carl D. Porter, Valencia, Calif.

[73] Assignee: Pertec Peripherals Corporation, Chatsworth, Calif.

[21] Appl. No.: 493,642

[22] Filed: May 11, 1983

[51] Int. Cl.⁴ .......................... G11B 5/09; G11B 15/48
[52] U.S. Cl. ........................................ 360/53; 360/63; 360/74.1
[58] Field of Search .................. 360/53, 63, 74.1–74.7, 360/121, 70; 360/31, 75, 78, 106, 105, 109

[56] References Cited

U.S. PATENT DOCUMENTS

| | | | |
|---|---|---|---|
| 2,335,277 | 11/1943 | Heller | 360/63 |
| 3,088,101 | 4/1963 | Schrimpf | 360/53 |
| 3,315,041 | 4/1967 | Sampson | 360/63 |
| 3,359,548 | 12/1967 | Yoshii et al. | 360/53 |
| 3,539,734 | 11/1970 | Tsuchiya | 360/74.4 |

OTHER PUBLICATIONS

Automation, vol. 6, No. 3/4, Mar./Apr. 1971, "*A New Magnetic Tape Certifier*", pp. 21–22.

Primary Examiner—Raymond F. Cardillo, Jr.
Assistant Examiner—Steven R. Garland
Attorney, Agent, or Firm—Freilich, Hornbaker, Rosen & Fernandez

[57] ABSTRACT

A magnetic tape transport for recording digital data. The tape transport is selectively operable in either a parallel write mode for recording concurrently along multiple tracks in a standard format or a high density serial write mode for recording along one track at a time, the multiple tracks being recorded in sequence in a serpentine format. The transport uses standard multi-track read and write heads with each head having N transducers, where N is a positive integer greater than 1, supplemented by an additional multitrack read head or write head with N/2 transducers for N even or (N−1)/2 transducers for N odd, so that for either direction of tape movement, the tape will first pass a write head and then a read head. When moving in a first direction (forward) the tape will move past the write head and then past the first read head. When moving in a second (reverse) direction, the tape will move past the write head and then past the second read head, thus permitting data to be read for verification after writing for either direction of tape movement. When operating in the high density serial mode, the heads are selectively enabled to serially record data along a single track at a time with the tracks being serially recorded in a serpentine format, i.e., in a forward direction along track one, a reverse direction along track two, a forward direction along track three, etc.

10 Claims, 8 Drawing Figures

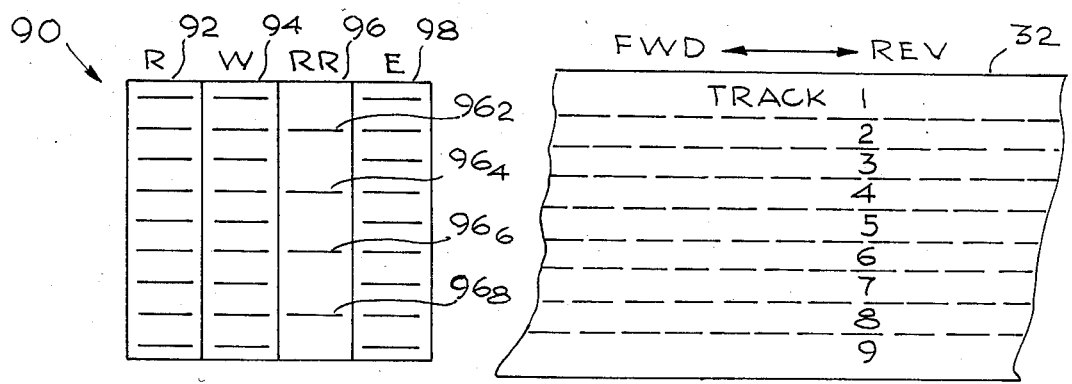
*Fig. 3*
SERPENTINE MODE
| TRACK | TAPE DIRECT | R | W | RR |
|---|---|---|---|---|
| 1 | FWD | 1 | 1 | |
| 2 | REV | | 2 | 2 |
| 3 | FWD | 3 | 3 | |
| 4 | REV | | 4 | 4 |
| 5 | FWD | 5 | 5 | |
| 6 | REV | | 6 | 6 |
| 7 | FWD | 7 | 7 | |
| 8 | REV | | 8 | 8 |
| 9 | FWD | 9 | 9 | |
*Fig. 4A*
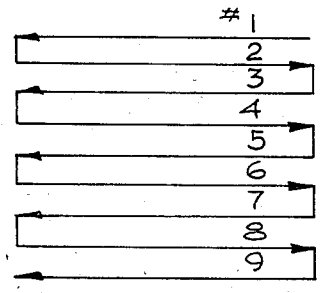
*Fig. 4B*
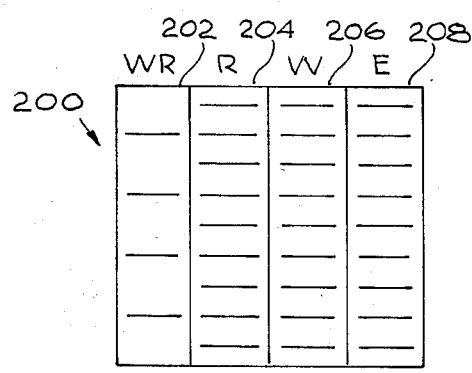
*Fig. 6*
SERPENTINE MODE
| TRACK | TAPE DIRECT | W | R | WR |
|---|---|---|---|---|
| 1 | FWD | 1 | 1 | |
| 2 | REV | | 2 | 2 |
| 3 | FWD | 3 | 3 | |
| 4 | REV | | 4 | 4 |
| 5 | FWD | 5 | 5 | |
| 6 | REV | | 6 | 6 |
| 7 | FWD | 7 | 7 | |
| 8 | REV | | 8 | 8 |
| 9 | FWD | 9 | 9 | |
*Fig. 7*

DIGITAL TAPE TRANSPORT FOR SELECTIVELY RECORDING IN EITHER A PARALLEL OR SERIAL MODE

This invention relates generally to magnetic tape transports useful for digital data recording.

The prior art is replete with various magnetic tape transports suitable for recording digital data. In a typical tape transport, the head assembly includes multiple write transducers, each for recording data along a separate track. Most existing digital data transports are compatible with one of the standardized recording formats; e.g., a nine track IBM compatible format (ANSI X3.39) which specifies parameters such as data block preamble and postamble and interblock gap length. Such transports typically include multiple (hereinafter assumed to be nine) fixed and aligned write transducers which concurrently write an eight bit byte and a single parity bit across the width of a tape which is pulled past the aligned transducers. Such transports also typically include one read transducer per track positioned to enable each bit to be read immediately after it is written for verification purposes.

Most existing tape transports are of the start/stop type utilizing tape repositioning to introduce the interblock gaps. Other transports are intended primarily to operate in a streaming mode in which the tape moves continuously and the interblock gaps are automatically inserted during tape movement. Such so-called streaming tape transports are generally less expensive than start/stop tape transports because they do not require the tension arm or vacuum column devices normally used to permit very rapid tape acceleration. Streaming tape transports are primarily used as backup for hard disk storage devices (see, for example, "Streaming Revives One Half Inch Tape Market," *Mini-Micro Systems*, May, 1980, page 173).

For many applications, it is important for a tape transport to be compatible with a standard format so that the transport can readily read tapes which have been recorded on other transports, and vice versa. On the other hand, for typical backup applications, standard format compatibility is generally not required. Rather, maximum data capacity per tape reel is a primary objective.

SUMMARY OF THE INVENTION

The present invention is directed to an improved tape transport selectively operable in either a parallel write mode for recording concurrently along multiple tracks in a standard format or a high density serial write mode for recording along one track at a time, the multiple tracks being recorded in sequence in a serpentine format.

In accordance with the invention, standard multitrack read and write heads are supplemented by an additional multitrack read head or write head so that for either direction of tape movement, the tape will first pass a write head and then a read head.

More particularly, in one disclosed embodiment of the invention, standard nine track read and write heads are provided and are supplemented by a second read head mounted so that the write head is sandwiched between the two read heads. When moving in a first direction (forward) the tape will move past the write head and then past the first read head. When moving in a second (reverse) direction, the tape will move past the write head and then past the second read head, thus permitting data to be read for verification after writing for either direction of tape movement. When operating in the high density serial mode, the heads are selectively enabled to serially record data along a single track at a time with the tracks being serially recorded in a serpentine format, i.e., in a forward direction along track one, a reverse direction along track two, a forward direction along track three, etc.

DESCRIPTION OF THE FIGURES

FIG. 3 schematically represents a head assembly in accordance with the present invention for enabling data to be selectively recorded on a magnetic tape in a standard parallel format or a higher density serial serpentine format;

FIG. 4A is a table depicting the manner in which the transducers of FIG. 3 are enabled to record data in a serpentine format;

FIG. 4B schematically depicts the manner in which tracks are recorded on a magnetic tape in accordance with the serpentine format;

FIG. 6 is a schematic diagram, similar to FIG. 3, but representing an alternative embodiment of the invention; and FIG. 7 comprises a table, similar to the table of FIG. 4A indicating the manner in which the transducers of FIG. 6 are controlled to record in accordance with the serpentine format.

DETAILED DESCRIPTION

Figure 1:
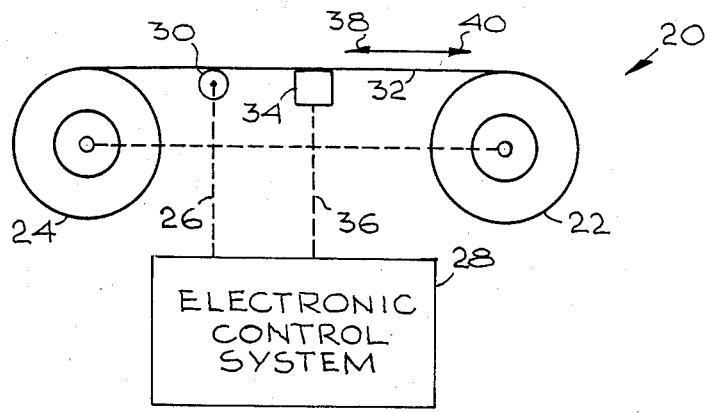
FIG. 1 is a generalized schematic representation of a typical tape transport.

Attention is initially directed to FIG. 1 which schematically and very generally depicts a typical magnetic tape transport 20 including a supply reel 22 and take-up reel 24. Reel drive motors (not shown) coupled to the supply and take-up reels are controlled by the tape motion output 26 of an electronic control system 28. The tape motion output 26 typically also controls a motor driving a capstan 30 which engages a magnetic tape 32 to pull it past a head assembly 34. The head assembly 34 is controlled by the data output 36 of the electronic control system 28.

Typically, the control system 28 controls the reels 22, 24, and capstan 30 to selectively pull the tape 32 in either a first or forward direction represented by arrowhead 38 and a second or reverse direction represented by arrowhead 40. The system generally depicted in FIG. 1 represents a tape transport operable in a start/stop mode or a streaming mode or selectively, in either mode.

Figure 2:
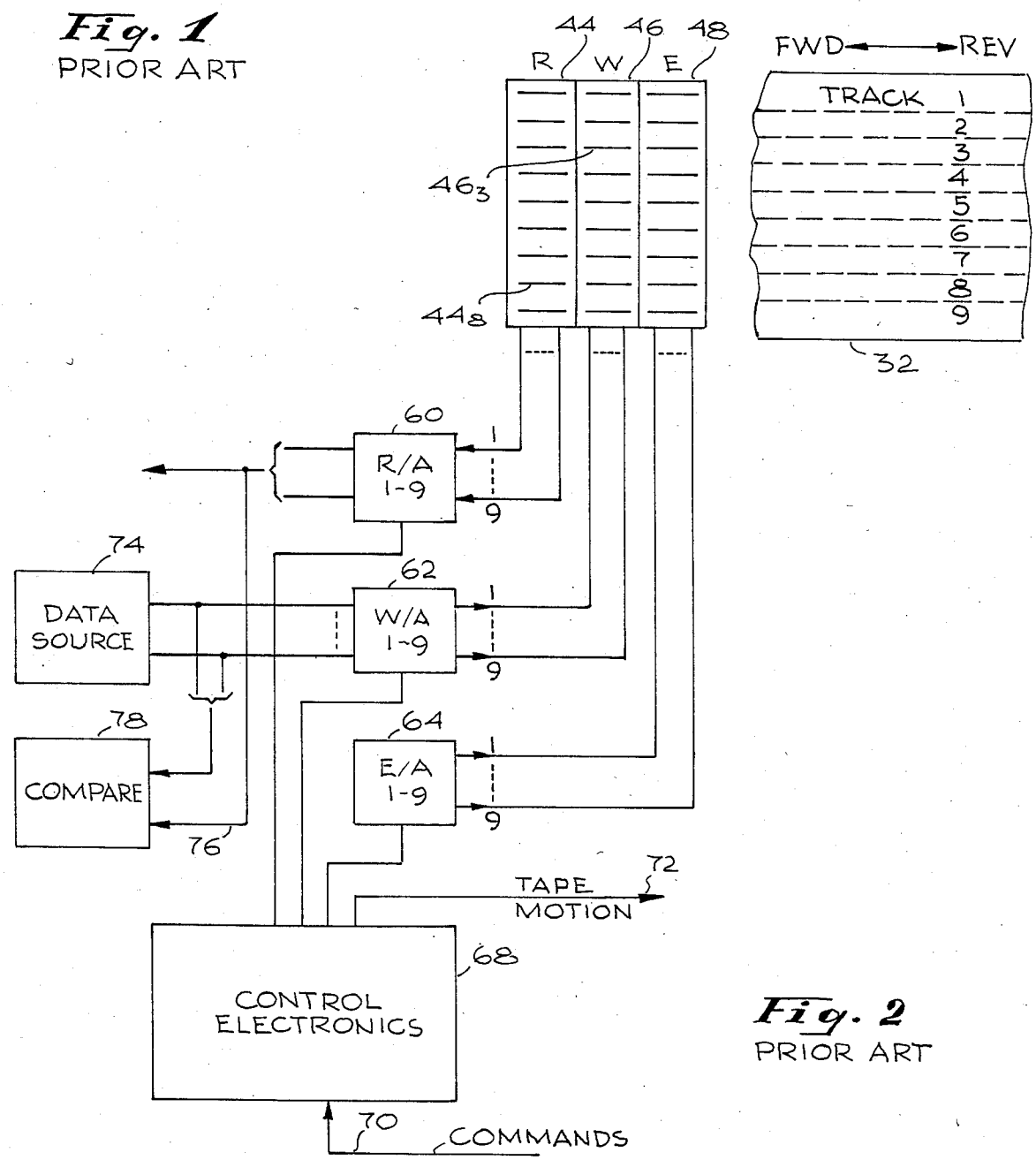
FIG. 2 schematically represents a typical prior art tape transport for recording a standard nine track format.

Attention is now directed to FIG. 2 which depicts a typical nine track head assembly 34 and its relationship to a magnetic tape 32 which can be pulled therepast in a forward and reverse direction. The head assembly 34 is depicted as being comprised of a read head 44, a write head 46, and an erase head 48. The write head 46 is sandwiched between the read head 44 and erase head 48. Each of the read and write heads is comprised of multiple (N) transducers which extend across the width of the tape 32 such that each transducer is aligned with a different one of the multiple tape tracks. Thus, for example, write transducer $46_3$ is aligned with track 3 and read transducer $44_8$ is aligned with track 8. The erase head 48 may likewise be comprised of multiple transducers or alternatively may be comprised of a single transducer having a gap which spans all the tracks. Each of the heads will hereinafter be assumed to contain nine transducers thus enabling nine tracks of data to be recorded on and read from the tape 32. A nine track format, consisting of an eight bit byte and a parity bit, is characteristic of perhaps the most widely used digital data tape format; i.e., the standard IBM format (ANSI ×3.39) which specifies certain parameters such as data block preamble and postamble and interblock gap length. Although these parameters will not be discussed in detail, it will be assumed herein that the system depicted in FIG. 2, as well as the systems depicted in FIGS. 3 and 6, are capable of recording digital data in accordance with the aforementioned format or some other standard parallel recording format.

The read, write, and erase heads depicted in FIG. 2 are arranged so that when the tape 32 is moving in a forward direction, it will pass, in sequence, the erase, write, and read heads. In writing information in accordance with a standard nine track format, all nine tracks are recorded concurrently. In typical operation, in order to record data on tape 32, the tape 32 will move in a forward direction and as each byte area (i.e., the width of the tape extending one bit along the tape length) moves past the erase head 48, it will be erased prior to it passing the write head 46 where a nine bit byte will be recorded. Subsequently, when that byte area passes the read head 44, the recorded bits will be read from the tape and compared with the data intended to be previously recorded by the write head. In a typical system, the tape will move at 125 inches per second and bits, along a track, will be recorded at a density of either 1,600 bits per inch using a well known phase encoding (PE) technique or 6,250 bits per inch using a well known group code recording (GCR) technique. With a 2,400 foot reel, the PE techinque typically permits the recording of 16 megabytes and the GCR technique, 38.6 megabytes (assuming the inclusion of standard length gaps between 512 byte records).

FIG. 2 depicts the nine read transducers of read head 44 connected to nine separate read amplifiers 60. Similarly, the nine write transducers of head 46 are connected to nine write amplifiers 62. Likewise, nine erase transducers of head 48 are depicted as connected to nine erase amplifiers 64. The read amplifiers 60, write amplifiers 62, and erase amplifiers 64 are controlled by the control electronics 68 in response to operational command 70 supplied thereto. The control electronics 68 additionally controls tape motion, i.e., reel and capstan motors, via output 72.

In the typical operation of the transport schematically depicted in FIG. 2, as each byte area moves past the write head, the control electronics 68 will selectively enable the write amplifiers 62 to record the nine bit pattern defined by data source 74 within the byte area adjacent to the write head transducers. When that byte area subsequently moves under the read head 44, the read amplifiers 60 will be enabled by the control electronics 68 to read the tape and, via line 76, apply the read data to a comparator 78. The comparator 78 will compare the data read by the read amplifiers 60 with the data previously supplied by source 74 to the write head to verify that the data read from the tape matches the data intended to be recorded.

Attention is now directed to FIG. 3 which schematically depicts a head assembly 90 in accordance with the present invention, comprised of a read head 92, a write head 94, a read reverse head 96, and an erase head 98. The head assembly 90 is mounted adjacent a tape path in the ordinary manner to record data on or read data from tape 32 which can be tansported in either a forward or reverse direction.

It will be noted that the head assembly 90 of FIG. 3 differs from the head assembly 34 FIG. 2 by the inclusion of the read reverse head 96 which is mounted between the write and erase heads. Whereas the read, write, and erase heads of assembly 90 comprise standard N track heads, as in the head assembly 34 FIG. 2, the read reverse head 96 requires only N/2 transducers, (N-1/2, where N is odd). Thus, head 96 is depicted as including four transducers $96_2$, $96_4$, $96_6$, $96_8$, respectively aligned with tracks two, four, six, and eight.

The inclusion of the read reverse head 96 in the assembly 90 in accordance with the invention is for the purpose of enabling data to be selectively recorded in either an N track parallel mode or a serial serpentine mode. As has been previously mentioned, when operating in the parallel write mode, the head assembly 90 will utilize heads 92, 94, and 98 and function substantially identically to the head 34 of FIG. 2 to concurrently record data in each of the nine tape tracks. When operating in the serial write mode to record data in a serpentine format, the write transducers will be operated in sequence so that data will be recorded on only one track at a time. Thus, as depicted in FIG. 4B, in the serpentine format, data will be initially recorded in track one as the tape moves in a forward direction, then along track two as the tape moves in a reverse direction, then along track three as the tape moves in a forward direction, etc. When the tape moves in a forward direction, the data recorded by write head 94 will be immediately read by read head 92 for verification. On the other hand, when the tape moves in a reverse direction, the data recorded by write head 94 will be read by read reverse head 96 for purposes of verification. This mode of operation is described by the table depicted in FIG. 4A.

Figure 5:
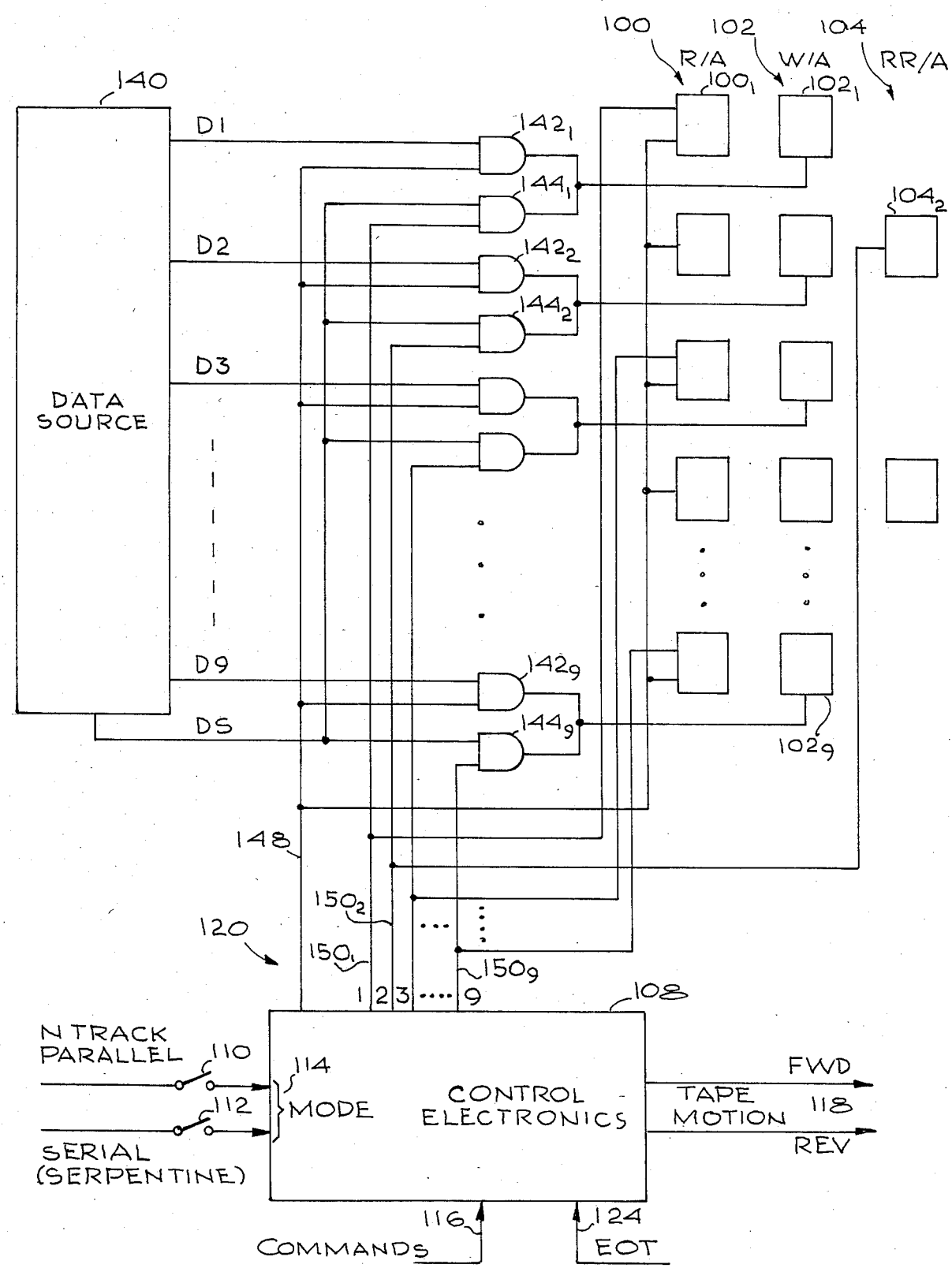
FIG. 5 is a schematic block diagram generally depicting the electronic control subsystem for controlling the transducers of FIG. 3.

Attention is now directed to FIG. 5 which comprises a generalized block diagram depicting the manner in which read amplifiers 100, write amplifiers 102, and read reverse amplifiers 104, respectively connected to heads 92, 94, and 96, are controlled by the control electronics 108. It will initially be assumed that the operating mode, i.e., parallel write or serial write is defined to the control electronic 108 by switches 110 and 112 connected to the control electronics mode input 114. It will also be assumed that the control electronics 108 is supplied with commands by input 116 which, among other things, instructs the transport to either read or write. Based upon the command information, the control electronics 108 controls tape motion via output 118 and controls data reading and writing via outputs 120. As depicted, an end of tape signal input 124 is connected to the control electronics 108 to communicate that the tape 32 has reached the end of a track, thereby requiring that the direction of tape movement be reversed when operating in the serial write mode.

FIG. 5 depicts a data source 140 capable of outputting data in parallel on the nine output lines D1, D2, . . . D9 and serially on output line DS. The parallel lines D1, D2, . . . D9 are respectively connected to the input of gates $142_1$, $142_2$, . . . $142_9$. The serial data output line DS is connected to the input of gates $144_1$, $144_2$, . . .

144₉. The output of each gate pair is connected to the input of a different write amplifier; thus, for example, the output of gate pair 142₁ and 144₁ is connected to the input of write amplifier 102₁.

When operating in the parallel write mode, the control electronics 108 concurrently enables all of the gates 142 via data control line 148. As a consequence, the data source 140 will supply data in parallel to the nine write amplifiers 102 to concurrently record data on the nine tape tracks. On the other hand, when operating in the serial write mode, the control electronics 108 will enable gates 144 in sequence such that the serial data supplied by source 140 on output lines DS will be fed through a single gate 144 for the length of the tape and then, after the tape end is reached, the control electronics 108 will enable a succeeding gate 144. The control electronics 108 selectively enables selected gates 144 in sequence via the nine separate data control output lines 150.

Inasmuch as it is necessary to read data immediately after it is written for purposes of verification, the read amplifiers 100 and read reverse amplifiers 104 are also controlled by the data control line 148 in the parallel write mode and the data control lines 150 in the serial write mode. Thus, when operating in the parallel write mode, data control line 148 will enable all of the read amplifiers 100 to thereby concurrently read all nine tracks recorded by write amplifiers 102. On the other hand, when operating in the serial write mode, the nine data control lines 150 will be enabled in sequence such that when line 150₁ is enabled, read amplifier 100₁ will be enabled. When data control line 150₂ is enabled, then read reverse amplifier 104₂ is enabled.

Thus, the control electronics 108 of FIG. 5 controls the enabling of the read amplifiers 100 and read reverse amplifiers 104 in accordance with the table of FIG. 4A which depicts operation during the serial write or serpentine mode.

It is pointed out that the erase head and related electronics have been omitted from FIG. 5 for purposes of clarity. In actuality, an erase head is preferably utilized, in the manner depicted in FIG. 3 such that all N tracks are erased prior to recording, in both the parallel write and serial write modes.

Attention is now directed to FIG. 6 which illustrates an alternative head assembly 200 in accordance with the invention. The head assembly 200 includes a write reverse head 202, read head 204, write head 206, and erase head 208. Note that the heads 204, 206, and 208 are essentially standard, each being comprised of nine transducers whereas the write reverse head 202 includes only four transducers respectively aligned with tracks 2, 4, 6, and 8.

When the tape is moved in a forward direction, it initially passes write head 206 and then read head 204. When the tape is moved in a reverse direction, it initially passes write reverse head 202 and then read head 204. Thus, the head assembly 200 enables a tape transport to operate in the serpentine mode described by the table of FIG. 7. That is, track one is recorded with the tape moving in a forward direction with head 206 writing, followed by head 204 reading for verification. Track two is recorded with the tape moving in a reverse direction with the write reverse head 202 writing followed by head 204 reading for verification.

From the foregoing, it should now be recognized that an improved tape transport has been disclosed herein useful for digital data recording. Embodiments of the invention are characterized by being selectively operable in either a parallel write mode for recording concurrently along multiple tracks or a serial write mode for recording along one track at a time, the successive tracks being recorded in sequence in a serpentine format. In a typical embodiment of the invention, data can be recorded in a parallel write mode using either phase encoded (PE) or group code recording (GCR) techniques. The following table compares the recording densities for the PE and GCR techniques as well as for a serial write mode using the serpentine formates:

COMPARISON PE vs. GCR vs. SERPENTINE
BASIS:
 10 ½" reel, ½" tape
 2400 feet of 1.5 mil tape
 125IPS tape speed
 512 byte record length standard

| ATTRIBUTES | PE | GCR | SERPENTINE |
|---|---|---|---|
| Recording Density | 1600 BPI | 6250 BPI | 7800 BPI |
| Gap Requirements | 0.6" | 0.3" | 0 |
| Density on Tape | 3200 FRPI | 9042 FRPI | 10,000 FRPI |
| Record Length on Tape | 0.920" | 0.382" | 0.525" |
| Capacity on Tape | 16 M Bytes | 38.6 M Bytes | 252 M Bytes |
| Transfer Rate | 200 K Bytes/Sec | 781 K Bytes/Sec | 120 K Bytes/Sec |

| For 2048 Byte PE & GCR Record Lengths: | | | |
|---|---|---|---|
| Record Length on Tape | 1.88" | 0.628" | 2.10" |
| Capacity | 31.4 M Bytes | 94 M Bytes | 252 M Bytes |

| For Infinite PE & GCR Record Length (i.e., No Gaps): | | | |
|---|---|---|---|
| Capacity | | 46.1 M bytes | 180 M Bytes | 252 M Bytes |

Although data can be recorded in various manners in the serpentine mode, the following table depicts a typical organization of bits within a 4200 bit record:

```
  32 Bits Synchronization
   4 Bits Mark A* (*Special 5-Code)
   4 Bits Address Info
   4 Bits Mark B*
4096 Bits Data (512 Bytes)
  48 Bits Error Correcting Code (ECC)
   4 Bits Mark B*
   4 Bits Address Info
   4 Bits Mark A*
4200 Bits/ Record
```

Tape marks are denoted by special mark character.
EOT indicated only on last pass.

Although particular embodiments of the invention have been described and illustrated herein, it is recognized that modifications and variations may readily occur to those skilled in the art, and consequently, it is intended that the claims be interpreted to cover such modifications and equivalents.

I claim:
1. An improved magnetic tape apparatus for recording and reading digital data comprising:
 a read and write transducer assembly means; means for drawing an elongated magnetic tape along a path past said transducer assembly means in either a firt or second direction where said direction is opposite to said first direction;

said transducer assembly means including a plurality of N write transducers aligned across the width of said tape path to record data along N parallel tracks on said tape, where N is a positive integer other than 1;

said transducer assembly means further including a first plurality of read transducers aligned across the width of said tape path parallel to and closely spaced in said first direction from said write transducers;

said transducer assembly means further including a second plurality of read transducers aligned across the width of said tape path parallel to and closely spaced in said second direction from said write transducers;

said first plurality of read transducers consisting of N transducers and said second plurality of read transducers consisting of N/2 transducers if N is even or (N-1)/2 transducers if N is odd.

2. The apparatus of claim 1 including means for defining either a parallel recording mode or a serial recording mode;

means operable during said parallel recording mode for concurrently enabling said N write transducers to concurrently record data on said N tracks; and means operable during said serial recording mode for enabling said N write transducers in sequence to record data on only one of said N tracks at a time.

3. The apparatus of claim 2 wherein said means for drawing tape is operable during said serial recording mode for alternately drawing said tape in said first and second directions; and wherein said means operable during said serial recording mode for enabling said write transducers is operable to enable a selected transducer in a first group while said tape is drawn in one direction and a selected transducer in a second group when the tape is drawn in the other direction whereby data can be recorded along said tracks in a serpentine pattern.

4. The apparatus of claim 3 further including means operable during said parallel recording mode for concurrently enabling said first plurality of read transducers to concurrently read data from said N tracks to verify the data recorded by said N write transducers; and including means operable during said serial recording mode for enabling the one of said first plurality of read transducers aligned with the enabled write transducer when said tape is drawn in said first direction and the one of said second plurality of read transducers aligned with the enabled write transducer when said tape is drawn in said second direction to verify the data recorded by the enabled write transducer.

5. An improved magnetic tape apparatus for recording and reading digital data comprising:

a read and write transducer assembly means;

means for drawing an elongated magnetic tape along a tape path past said transducer assembly means in either a first or second direction where second direction is opposite to said first direction.

said transducer assembly means including a plurality of N read transducers aligned across the width of said tape path to read data along N parallel tracks on said tape, where N is a positive integer other than 1;

said transducer assembly means further including a first plurality of write transducers aligned across the width of said tape path parallel to and closely spaced in said first direction from said read transducers;

said transducer assembly means further including a second plurality of write transducers aligned across the width of said tape path parallel to and closely spaced in said second direction from said read transducers;

said first plurality of write transducers consisting of N transducers and said second plurality of write transducers consisting of N/2 transducers if N is even or (N−1)/2 transducers if N is odd.

6. The apparatus of claim 5 including means for defining either a parallel recording mode or a serial recording mode; and wherein said means for drawing tape is operable during said parallel recoding mode for drawing said tape in said first direction and operable during said serial recording mode for alternately drawing said tape in said first and second directions.

7. The apparatus of claim 6 including means operable during said parallel recording mode for concurrently enabling said first plurality of write transducers to concurrently record data on said N tracks; and means operable during said serial recording mode for enabling one of said first plurality of write transducers when said tape is drawn in said first direction and for enabling one of said second plurality of write transducers when said tape is drawn in said second direction.

8. The apparatus of claim 7 wherein the transducers of each of said first and second pluralities of write transducers are enabled in sequence whereby data can be recorded along said tracks in a serpentine pattern.

9. The apparatus of claim 8 further including means operable during said serial recording mode for also enabling the read transducer aligned with each enabled write transducer to verify the data recorded by the enabled write transducer.

10. An apparatus for selectively recording and reading digital data on an elongated magnetic tape in either an N track parallel format or an N track serial serpentine format, where N is a positive integer other than 1, said apparatus comprising:

means for transporting a magnetic tape along a tape path in either a first or second direction where said second direction is opposite to said first direction.

N write transducers mounted adjacent said tape path across the width thereof;

means for selectively defining a parallel write operational mode or a serial write operational mode;

means operable during said parallel write operational mode for transporting said tape in said first direction and for enabling said N write transducers for recording digital data along N parallel tracks extending along said tape;

N first read transducers mounted adjacent said tape path across the width thereof and closely spaced from said N write transducers in said first direction whereby data recorded on said tape by said N write transducers can be immediately read by said N first read transducers;

(N-1)/2 if N is odd or N/2 if N is even second read transducers mounted adjacent said tape path across the width thereof and closely spaced from said N write transducers in said second direction, said second read transducers being mounted proximate to alternate tracks on said tape;

means operable during said serial write operational mode for alternately transporting said tape in said first and second directions and for enabling said N write transducers in sequence to record data on only one track at a time with said tracks being recorded in serpentine format; and means operable during said serial write operational mode for enabling one of said first read transducers when said tape is transported in said first direction and for enabling one of said second read transducers when said tape is transported in said second direction for verifying the data recorded on said tape by the enabled write transducer.

* * * * *